(12) United States Patent
Venkataraman et al.

(10) Patent No.: US 12,388,688 B2
(45) Date of Patent: Aug. 12, 2025

(54) PRETAP EQUALIZABLE CONTINUOUS TIME LINEAR EQUALIZER

(71) Applicant: TEXAS INSTRUMENTS INCORPORATED, Dallas, TX (US)

(72) Inventors: Jagannathan Venkataraman, Bangalore (IN); Ani Xavier, Bangalore (IN); Arun Mohan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/524,463

(22) Filed: Nov. 30, 2023

(65) Prior Publication Data

US 2025/0184190 A1    Jun. 5, 2025

(51) Int. Cl.
*H04L 25/03* (2006.01)
*H04L 1/00* (2006.01)
*H04L 5/00* (2006.01)
*H04L 27/01* (2006.01)

(52) U.S. Cl.
CPC ...... *H04L 25/03878* (2013.01); *H04L 1/0041* (2013.01); *H04L 5/0005* (2013.01); *H04L 27/01* (2013.01)

(58) Field of Classification Search
CPC ............. H04L 25/03878; H04L 1/0041; H04L 5/0005; H04L 27/01
See application file for complete search history.

(56) References Cited

U.S. PATENT DOCUMENTS

| | | | |
|---|---|---|---|
| 8,335,249 B1* | 12/2012 | Su | H03F 3/45197 375/232 |
| 11,201,767 B1* | 12/2021 | English | H04L 25/03127 |
| 2005/0259726 A1 | 11/2005 | Farjad-rad | |
| 2015/0319020 A1* | 11/2015 | Song | H04L 25/0272 345/204 |
| 2017/0025816 A1* | 1/2017 | Tanaka | H01S 5/0427 |
| 2021/0152404 A1* | 5/2021 | Levin | H04L 25/03885 |

FOREIGN PATENT DOCUMENTS

| | | |
|---|---|---|
| WO | 2014158482 A1 | 10/2014 |
| WO | 2018217786 A1 | 11/2018 |

* cited by examiner

*Primary Examiner* — Freshteh N Aghdam
(74) *Attorney, Agent, or Firm* — Mandy Barsilai Fernandez; Frank D. Cimino

(57) ABSTRACT

A circuit includes first, second, third, and fourth transistors, and a capacitor. The first transistor has a first terminal, a second terminal, and a control terminal. The second transistor has a first terminal, second terminal, and a control terminal. The capacitor has a first conductor coupled to the second terminal of the first transistor, and a second conductor coupled to the second terminal of the second transistor. The third transistor has a first terminal coupled to the first terminal of the second transistor, a second terminal, and a control terminal coupled to the control terminal of the first transistor. The fourth transistor has a first terminal coupled to the first terminal of the first transistor, a second terminal coupled to the second terminal of the third transistor, and a control terminal coupled to the control terminal of the second transistor.

20 Claims, 7 Drawing Sheets

PRETAP EQUALIZABLE CONTINUOUS TIME LINEAR EQUALIZER

BACKGROUND

Serial communication links experience high frequency distortion (phase and amplitude) between the transmitter and receiver over a lossy channel. This distortion is manifested at the receiver as inter-symbol interference, i.e., a smearing of the transmitted data bits/symbols. Channel equalization is used to counteract inter-symbol interference and other channel induced distortion. Channel equalization may be applied using transmission pre-emphasis that pre-distorts a transmit signal and/or as receiver equalization that applies post-compensation for the undesirable frequency effects of the channel.

SUMMARY

In one example, a circuit includes first, second, third, and fourth transistors, and a capacitor. The first transistor has a first terminal, a second terminal, and a control terminal. The second transistor has a first terminal, second terminal, and a control terminal. The capacitor has a first conductor coupled to the second terminal of the first transistor, and a second conductor coupled to the second terminal of the second transistor. The third transistor has a first terminal coupled to the first terminal of the second transistor, a second terminal, and a control terminal coupled to the control terminal of the first transistor. The fourth transistor has a first terminal coupled to the first terminal of the first transistor, a second terminal coupled to the second terminal of the third transistor, and a control terminal coupled to the control terminal of the second transistor.

In another example, a circuit includes first, second, third, fourth, and fifth transistors. The first transistor has a first terminal, a second terminal, and a control terminal. The second transistor is coupled to the first transistor as a first differential pair. The second transistor has a first terminal, a second terminal, and a control terminal. The third transistor has a first terminal, a second terminal, and a control terminal. The first terminal of the third transistor is coupled to the first terminal of the second transistor. The control terminal of the third transistor is coupled to the control terminal of the first transistor. The fourth transistor is coupled to the third transistor as a second differential pair. The fourth transistor has a first terminal, a second terminal, and a control terminal. The first terminal of the fourth transistor is coupled to the first terminal of the first transistor. The control terminal of the fourth transistor is coupled to the control terminal of the second transistor. The fifth transistor is coupled to the second differential pair. The fifth transistor is configured to switchably enable pre-tap equalization.

In a further example, a deserializer includes a clock data recovery circuit and a linear equalizer circuit. The linear equalizer circuit is coupled to the clock data recovery circuit. The linear equalizer circuit includes first, second, third, fourth, and fifth transistors, a capacitor, and first and second current sources. The first transistor has a first terminal, a second terminal, and a control terminal. The second transistor has a first terminal, second terminal, and a control terminal. The capacitor has a first conductor coupled to the second terminal of the first transistor, and a second conductor coupled to the second terminal of the second transistor. The first current source has a first terminal coupled to the first conductor, and a second terminal coupled to a reference voltage terminal. The second current source has a first terminal coupled to the second conductor, and a second terminal coupled to the reference voltage terminal. The third transistor has a first terminal coupled to the first terminal of the second transistor, a second terminal, and a control terminal coupled to the control terminal of the first transistor. The fourth transistor has a first terminal coupled to the first terminal of the first transistor, a second terminal coupled to the second terminal of the third transistor, and a control terminal coupled to the control terminal of the second transistor. The fifth transistor is coupled to the third transistor. The fifth transistor is configured to switchably enable pre-tap equalization.

DETAILED DESCRIPTION

Figure 1A:
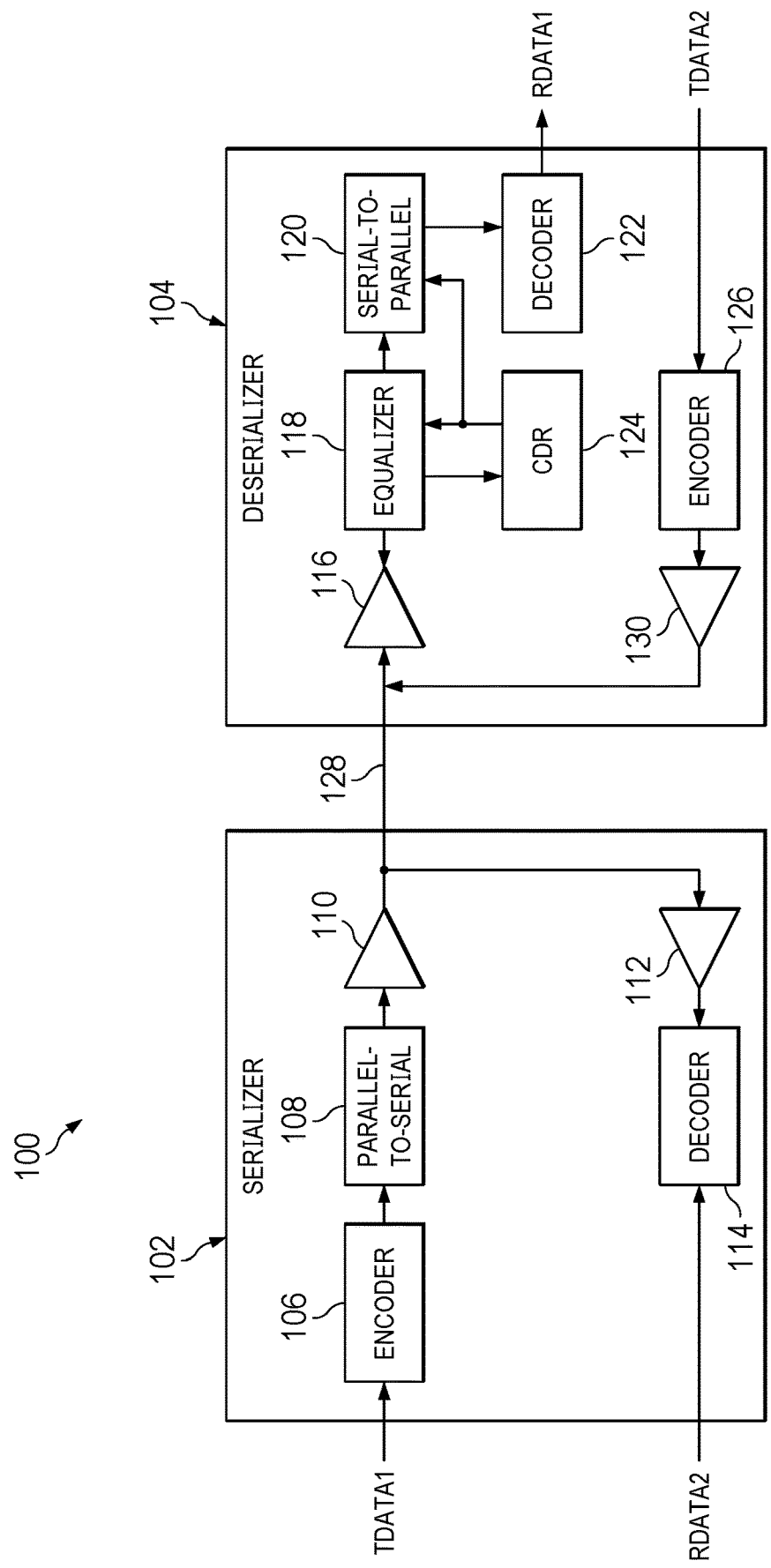
FIG. 1A a block diagram of an example serial communication system.

FIG. 1A a block diagram of an example serial communication system 100. The serial communication system 100 includes a serializer 102 and a deserializer 104 connected via a communication channel 128. The communication channel 128 may be a wired connection, such as a coaxial cable or a twisted pair. The serializer 102 includes an encoder 106, a parallel-to-serial converter 108, and a transmitter 110 for forward channel communication. Forward channel communication may include transmission of video data, audio data, control data, etc. from the serializer 102 to the deserializer 104 via the communication channel 128. Examples of the serializer 102 may also include a receiver 112 and a decoder 114 for back channel reception. The serializer 102 receives data to be transmitted (TDATA1), and the encoder 106 encodes the data for transmission. TDATA1 may be video received from video source or any other type of data provided by a data source. The encoder 106 may, for example, encode TDATA1 for DC balance, to add clock information, and/or introduce scrambling. The parallel-to-serial converter 108 converts the encoded data received from the encoder 106 to a serial bit-stream that is driven onto the communication channel 128 by the transmitter 110. The transmitter 110 may provide differential or single-ended drive in various examples.

The deserializer 104 includes a receiver 116, an equalizer 118, a serial-to-parallel converter 120, a decoder 122, and a clock data recovery circuit 124 for forward channel reception. The deserializer 104 may also include an encoder 126 and a transmitter 130 for back channel transmission. The receiver 116 detects the signal transmitted by the serializer 102 propagated through the communication channel 128. The equalizer 118 applies one or more equalization techniques to recover the data received from the communication channel 128. The equalizer 118 provides equalized data to the serial-to-parallel converter 120 and the clock data recovery circuit 124. The clock data recovery circuit 124 recovers a clock signal from the equalized data. The clock data recovery circuit 124 provides the recovered clock signal to the equalizer 118 and the serial-to-parallel converter 120. For example, the equalizer 118 may apply the recovered clock signal to sample the equalized data. The serial-to-parallel converter 120 converts the equalized serial data to parallel symbols. The decoder 122 reverses the encoding applied in the serializer 102 to recreate the data received by the serializer 102 for transmission (to recreate TDATA1). Accordingly, the output of the decoder 122 (RDATA1) is a recreation of TDATA1. The deserializer 104 may provide RDATA1 to a video display, a video processing system, a processor, or any other circuitry configured to receive from the deserializer 104.

Back channel communication may include transmission of control data or other data from the deserializer 104 to the serializer 102 via the communication channel 128 (e.g., simultaneous with forward channel transmission via the communication channel 128). The encoder 126 encodes data (e.g., TDATA2) received for transmission. TDATA2 may be a serial data stream received from a processor or other device. The transmitter 130 drives the encoded data received from the encoder 126 onto the communication channel 128.

In the serializer 102, the receiver 112 receives the signal present on the communication channel 128 and separates the data transmitted by the transmitter 130 from the data transmitted by the transmitter 110. The receiver 112 provides the received back channel data to the decoder 114, and the decoder 114 reverses the encoding applied in the deserializer 104 to recreate the data received by the deserializer 104 for transmission (to recreate TDATA2). Accordingly, the output of the decoder 114 (RDATA2) is a recreation of TDATA2. RDATA2 may be provided to processor or other device.

Figure 1B:
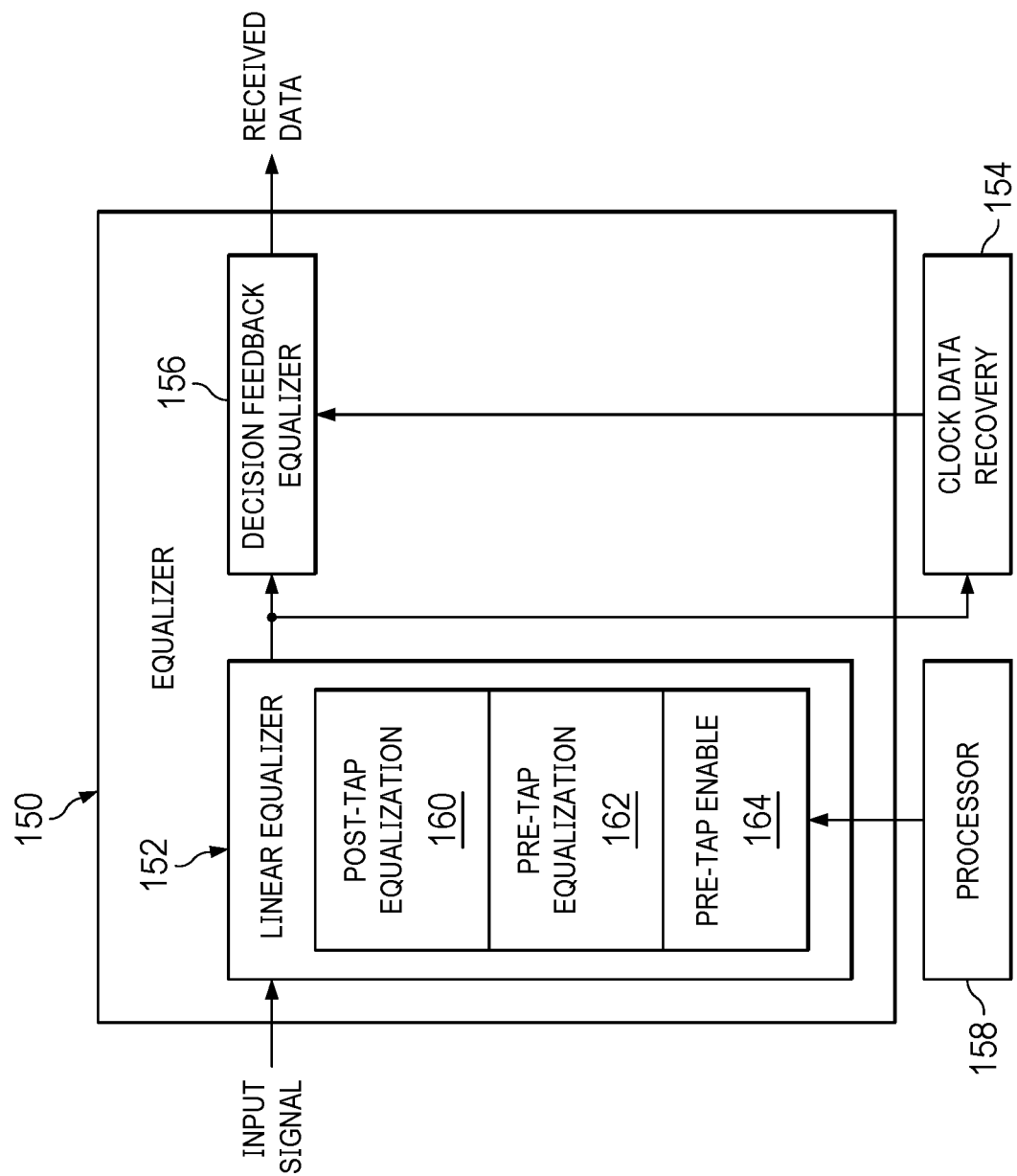
FIG. 1B is a block diagram of an example equalizer that includes linear equalization suitable for use in the deserializer of FIG. 1.

FIG. 1B is a block diagram of an example equalizer 150. The equalizer 150 may be an example of the equalizer 118. The equalizer 150 includes a continuous time linear equalizer circuit 152. Some examples of the equalizer 150 may also include a decision feedback equalizer 156, a feed forward equalizer, or other equalizer circuit. A clock data recovery circuit 154 and a processor 158 may be coupled to the equalizer 150. The continuous time linear equalizer circuit 152 is a linear equalizer that boosts both signal and noise. The decision feedback equalizer 156 is coupled to an output of the continuous time linear equalizer circuit 152. The decision feedback equalizer 156 is a non-linear equalizer that is immune to noise, but may present feedback loop timing challenges. The clock data recovery circuit 154 extracts a clock signal from the output of the continuous time linear equalizer circuit 152 for use by the decision feedback equalizer 156 and/or other circuitry (e.g., the serial-to-parallel converter 120).

The decision feedback equalizer 156 may provide post-tap equalization (correction of post-cursor inter-symbol interference). As data rate and modulation complexity increase, e.g., with implementation of pulse-amplitude modulation 4-level (PAM4), pre-tap equalization (correction of pre-cursor inter-symbol interference) becomes desirable. In some systems, a feed-forward equalizer in discrete time may be used to provide pre-tap equalization. Discrete time feed-forward equalizers can be costly in terms of both power and circuit area. The equalizer 150 includes a post-tap equalization circuit 160, a pre-tap equalization circuit 162, and a pre-tap enable circuit 164. The post-tap equalization circuit 160 provides post-tap equalization. The pre-tap equalization circuit 162 provides pre-tap equalization. The pre-tap enable circuit 164 controls the post-tap equalization circuit 160 and/or the pre-tap equalization circuit 162 to select pre or post-tap equalization based on a control signal received from the processor 158 or other control circuit. In the equalizer 150, examples of the continuous time linear equalizer circuit 152 may provide pre-tap equalization with reduced power consumption and circuit area relative to other pre-tap equalization circuits.

The unit interval sampled pulse response of a continuous time linear equalizer output has a time domain response given by the finite impulse response:

$$H\text{post}(z) = a - bZ^{-1} \tag{1}$$

where a is the coefficient of the main tap and b is the coefficient of the post tap.

The continuous time equivalent of H(Z), (H(s)), can be found using inverse bilinear transformation:

$$Z = e^{ST} = \frac{1 + ST/2}{1 - ST/2} \tag{2}$$

where T=1/fs (baud rate).

$$H post(s) = (a - b)\left(\frac{1 + S\frac{(a+b)}{(a-b)}T/2}{1 + ST/2}\right) \tag{3}$$

Equation (3) shows that the left half plane zero generates a post-tap. The ratio of pole to zero $$\left(\frac{(a+b)}{(a-b)}\right)$$

determines the boost in frequency and the values of the main tap coefficient a and the post-tap coefficient b.

To realize a pre-tap:

$$H\text{pre}(z) = -b + aZ^{-1} \tag{4}$$

where the main tap has a coefficient a, and the pre-tap has a coefficient b.

Using bilinear transformation:

$$H pre(s) = (a - b)\left(\frac{1 - S\frac{(a+b)}{(a-b)}T/2}{1 + ST/2}\right) \tag{5}$$

Comparing equations (3) and (5), the difference between Hpre and Hpost is the presence of a right half plane zero in Hpre.

The post/pre-tap pulse response for a continuous time linear equalizer may be defined as:

$$Hctle_{pulse(t)} = (U(t) - U(t-T))\text{conv } Hctle(t) \tag{6}$$

where U(t) is unit step, T is pulse width corresponding to baud rate, and Hctle(t) is the impulse response of the continuous time linear equalizer.

In the Laplace domain:

$$\text{Hctle\_post}_{pulse(s)} = \left(\frac{1}{s}(1 - e - sT)\right) X \, Hpost(s) \quad (7)$$

$$\text{where } Hpost(s) = \left(\frac{\left(1 + \frac{s}{Z}\right)}{\left(1 + \frac{s}{P}\right)}\right). \quad (8)$$

$$\text{Hctle\_post}_{pulse(t)} = \left[(e - Pt)\left(\frac{P}{Z} - 1\right) + 1\right] \quad (9)$$

$$u(t) - \left[(e - P(t-T))\left(\frac{P}{Z} - 1\right) + 1\right]u(t - T)$$

$$\text{Hctle\_pre}_{pulse(s)} = \left(\frac{1}{s}(1 - e - sT)\right) X \, Hpre(s) \quad (10)$$

$$\text{where } Hpre(s) = \left(\frac{\left(1 + \frac{s}{Z}\right)}{\left(1 + \frac{s}{P}\right)}\right).$$

$$\text{Hctle\_pre}_{pulse(t)} = \left[1 - (e - Pt)\left(\frac{P}{Z} + 1\right)\right] \quad (11)$$

$$u(t) - \left[1 - \left((e - P(t-T))\left(\frac{P}{Z} + 1\right)\right)\right]u(t - T)$$

A pre-tap continuous time linear equalizer may be derived from the post-tap continuous time linear equalizer of equation (8).

$$Hpre(s) = 2 - Hpost(s) = 2 - \left(\frac{\left(1 + \frac{s}{Z}\right)}{\left(1 + \frac{s}{P}\right)}\right) \quad (12)$$

With zero Z=P/K, (boost of post tap continuous time linear equalizer=K)

$$Hpre(s) = \left(\frac{1 - \frac{s}{P}(k-2)}{\left(1 + \frac{s}{P}\right)}\right) \quad (13)$$

In equation (13), the right hand plane zero provides a pre-tap boost of K−2. Z=P/(k+2) is needed to provide an equivalent post-tap continuous time linear equalizer boost.

Figure 2:
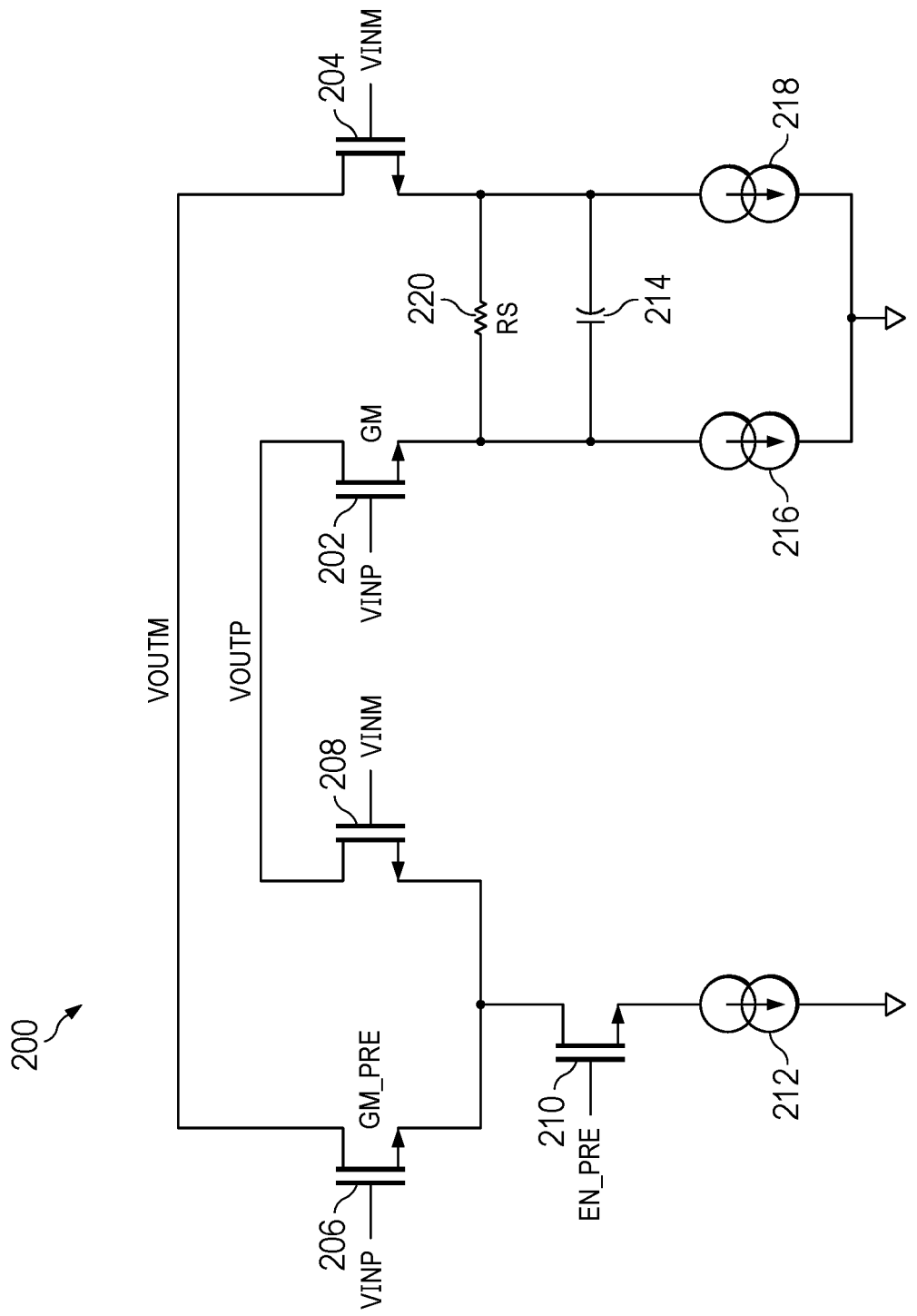
FIG. 2 is a schematic diagram of an example continuous time linear equalizer circuit with pre-tap equalization and optional post-tap equalization suitable for use in the equalizer of FIG. 1B.

FIG. 2 is a schematic diagram of an example continuous time linear equalizer circuit 200 with pre-tap equalization suitable for use in the equalizer 150. The continuous time linear equalizer circuit 200 is an example of the continuous time linear equalizer circuit 152. The continuous time linear equalizer circuit 200 includes transistors 202 and 204 connected as a first differential pair, and transistors 206 and 208 connected as a second differential pair. A first current terminal (e.g., drain) of the transistor 202 is coupled to a first output terminal (VOUTP) and to a first current terminal (e.g., drain) of the transistor 208. A first current terminal (e.g., drain) of the transistor 204 is coupled to a second output terminal (VOUTM) and to a first current terminal (e.g., drain) of the transistor 206. A control terminal (e.g., gate) of the transistor 202 is coupled to a first input terminal (VINP) and to a control terminal (e.g., gate of the transistor 206). A control terminal (e.g., gate) of the transistor 204 is coupled to a second input terminal (VINM) and to a control terminal (e.g., gate of the transistor 208). A second current terminal (e.g., source) of the transistor 206 is coupled to a second control terminal (e.g., source) of the transistor 208.

The continuous time linear equalizer circuit 200 also includes a transistor 210, current sources 212, 216, and 218, a resistor 220, and a capacitor 214. A first current terminal (e.g., drain) of the transistor 210 is coupled to the second current terminals of the transistor 206 and the transistor 208. A control terminal (e.g., gate) of the transistor 210 is coupled to a pre-tap equalization enable terminal (EN_PRE). A second current terminal (e.g., source) of the transistor 210 is coupled to a first terminal of the current source 212. A second terminal of the current source 212 is coupled to a reference voltage terminal (e.g., ground). The transistor 210 may be turned on to switchably enable pre-tap equalization (activate tail current flow through the transistors 206 and 208) in the continuous time linear equalizer circuit 200, and turned off to disable pre-tap equalization. The transistors 202, 204, 206, 208, and 210 may be n-type field effect transistors.

A first terminal of the resistor 220 is coupled to a second current terminal (e.g., source) of the transistor 202. A second terminal of the resistor 220 is coupled to a second current terminal (e.g., source) of the transistor 204. The capacitor 214 is coupled to the transistor 202 and the transistor 204 in parallel with the resistor 220. A first conductor (e.g., top plate) of the capacitor 214 is coupled to the first terminal of the resistor 220, and a second conductor (e.g., bottom plate) of the capacitor 214 is coupled to the second terminal of the resistor 220.

The current source 216 is coupled between the second current terminal of the transistor 202 and the reference voltage terminal. The current source 218 is coupled between the second current terminal of the transistor 204 and the reference voltage terminal. A first terminal of the current source 216 is coupled to the second current terminal of the transistor 202, and a second terminal of the current source 216 is coupled to the reference voltage terminal. A first terminal of the current source 218 is coupled to the second current terminal of the transistor 204, and a second terminal of the current source 218 is coupled to the reference voltage terminal.

In the continuous time linear equalizer circuit 200, the transistor 210 is turned off (EN_PRE=0) to activate post-tap equalization and the transistor 210 is turned on (EN_PRE=1) to activate pre-tap equalization. If the transistor 210 is turned off, $$\text{Hctle\_post}(s) = Hctle(s) = \left(\frac{gm}{1 + gm*Rs/2}\right)\left(\frac{1 + S(Rs*Cs)}{1 + \frac{S*Rs*Cs}{\left(1 + gm*\frac{Rs}{2}\right)}}\right)*Zout \quad (14)$$

With $$dcgain = \frac{gm}{1 + gm*Rs/2}, \, p = \frac{\left(1 + gm*\frac{Rs}{2}\right)}{Rs*Cs},$$

$$\text{and } z = \frac{(1)}{Rs*cs} = \frac{P}{1 + gm*\frac{Rs}{2}},$$

the post boost is $$K = 1 + gm * \frac{Rs}{2} \quad (15)$$

If the transistor 210 is turned on, the transistor 206 and the transistor 208 turn on with:

$$GM\_PRE = 2^*\left(\frac{gm}{1 + gm * Rs/2}\right) \quad (16)$$

$$Hctle\_pre(s) = \quad (17)$$

$$\left(\frac{gm}{1 + gm * Rs/2}\right)\left(\frac{1\frac{S*Rs*Cs}{\left(1 + gm*\frac{Rs}{2}\right)}*\left(gm*\frac{Rs}{2} - 1\right)}{1 + \frac{S*Rs*Cs}{\left(1 + gm*\frac{Rs}{2}\right)}}\right)*Zout$$

Pre-tap continuous time linear equalizer boost is:

$$\left(gm * \frac{Rs}{2} - 1\right) = k - 2 \quad (18)$$

In some examples, the transistor 206 may be 2/K times the size of the transistor 202.

Figure 3:
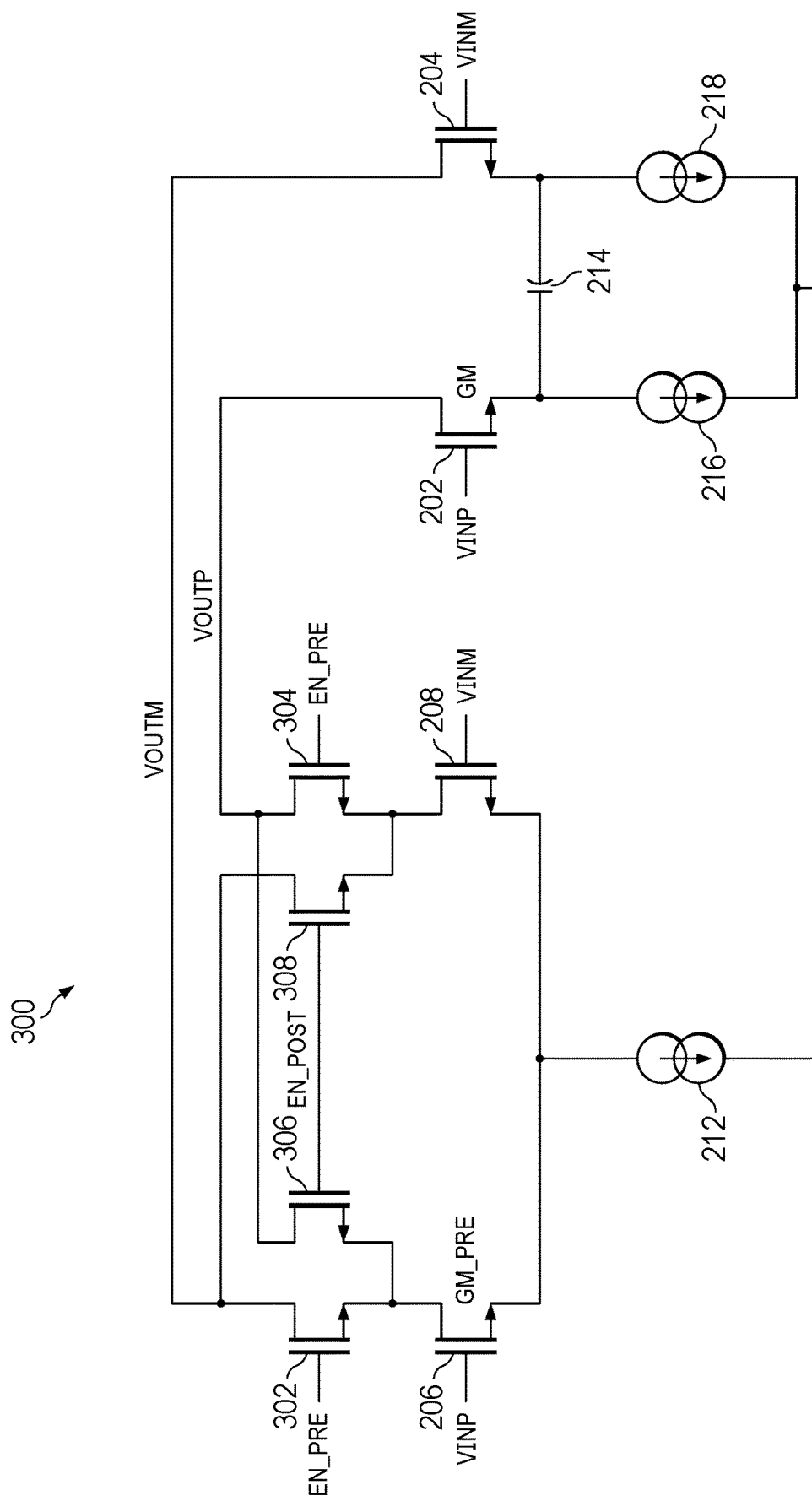
FIG. 3 is a schematic diagram of a second example continuous time linear equalizer circuit with pre-tap equalization and optional post-tap equalization suitable for use in the equalizer of FIG. 1B.

FIG. 3 is a schematic diagram of a second example continuous time linear equalizer circuit 300 with pre-tap equalization suitable for use in the equalizer 150. The continuous time linear equalizer circuit 300 is an example of the continuous time linear equalizer circuit 152. The continuous time linear equalizer circuit 300 may provide greater pre-tap equalization boost than the continuous time linear equalizer circuit 200, and may consume less circuit area. The continuous time linear equalizer circuit 300 includes transistors 202, 204, 206, and 208, capacitor 214, and current sources 212, 216, and 218 similar to the continuous time linear equalizer circuit 200. The continuous time linear equalizer circuit 300 also includes transistors 302, 304, 306, and 308 that select the connection of the transistor 206 and the transistor 208 to the transistor 202 and the transistor 204. Pre-tap equalization is selected by turning on the transistor 302 and the transistor 304 (and turning off the transistor 306 and the transistor 308). Post-tap equalization is selected by turning on the transistor 306 and the transistor 308 (and turning off the transistor 302 and the transistor 304).

The transistors 302, 304, 306, and 308 may be n-type FETs. The transistor 302 includes a first current terminal (e.g., drain) coupled to the first current terminal of the transistor 204, and a second current terminal (e.g., source) coupled to the first current terminal of the transistor 206. A control terminal (e.g., gate) of the transistor 302 is coupled to a pre-tap equalization enable terminal (EN_PRE). The transistor 304 includes a first current terminal (e.g., drain) coupled to the first current terminal of the transistor 202, and a second current terminal (e.g., source) coupled to the first current terminal of the transistor 208. A control terminal (e.g., gate) of the transistor 304 is coupled to the control terminal of the transistor 302.

The transistor 306 includes a first current terminal (e.g., drain) coupled to the first current terminal of the transistor 202, and a second current terminal (e.g., source) coupled to the first current terminal of the transistor 206. A control terminal (e.g., gate) of the transistor 306 is coupled to a post-tap equalization enable terminal (EN_PRE). The transistor 308 includes a first current terminal (e.g., drain) coupled to the first current terminal of the transistor 204, and a second current terminal (e.g., source) coupled to the first current terminal of the transistor 208. A control terminal (e.g., gate) of the transistor 308 is coupled to the control terminal of the transistor 306.

The transfer function of the continuous time linear equalizer circuit 300 with pre-tap equalization may be:

$$Hctle\_pre(s) = (gm\_pre)\left(\frac{1 - SCs * \frac{gm - gm_{pre}}{gm * gm\_pre}}{1 + \frac{S*Cs}{(gm)}}\right)*Zout \quad (19)$$

Pre-tap equalization boost and transconductance may be defined as:

$$Boost = Zero/pole = \left(\frac{gm}{gm\_pre} - 1\right) \quad (20)$$

$$gm\_pre = \frac{gm}{1 + gm * Rs} = gm * Rs = k - 1 \quad (21)$$

As per equation (21), the continuous time linear equalizer circuit 300 may provide a pre-tap equalization boost of k−1, rather than k−2 as in the continuous time linear equalizer circuit 200.

Figure 4:
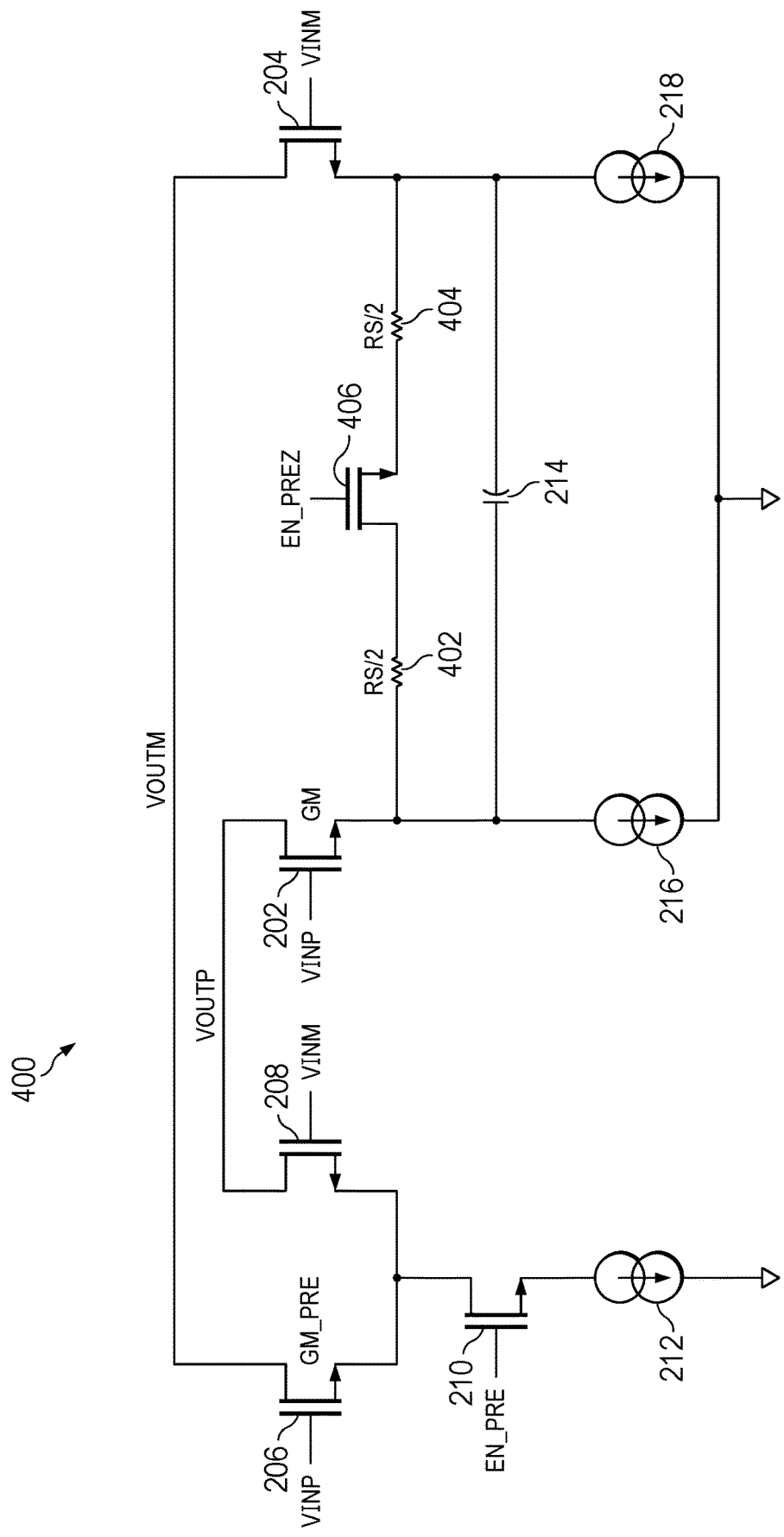
FIG. 4 is a schematic diagram of a third example continuous time linear equalizer circuit with pre-tap equalization and optional post-tap equalization suitable for use in the equalizer of FIG. 1B.

FIG. 4 is a schematic diagram of a third example continuous time linear equalizer circuit 400 with pre-tap equalization suitable for use in the equalizer 150. The continuous time linear equalizer circuit 400 is an example of the continuous time linear equalizer circuit 152. The continuous time linear equalizer circuit 400 may provide greater pre-tap equalization boost than the continuous time linear equalizer circuit 200, and may consume less circuit area. The continuous time linear equalizer circuit 400 includes transistors 202, 204, 206, 208, and 210, capacitor 214, and current sources 212, 216, and 218 similar to the continuous time linear equalizer circuit 200. The continuous time linear equalizer circuit 400 also includes resistors 402 and 404, and transistor 406. The transistor 406 connects the resistors 402 and 404 in parallel with the capacitor 214. A first terminal of the resistor 402 is coupled to the second terminal of the transistor 202, and a second terminal of the 402 is coupled to a first terminal (e.g., drain) of the transistor 406. A first terminal of the resistor 404 is coupled to the second terminal of the transistor 204, and a second terminal of the resistor 404 is coupled to a second terminal (e.g., source) of the transistor 406. A control terminal (e.g., gate) of the transistor 406 is coupled to pre-tap equalization disable terminal (EN_PREZ). Pre-tap equalization is selected by turning on the transistor 210 and turning off the transistor 406. Post-tap equalization is selected by turning on the transistor 406 and turning off the transistor 210.

With pre-tap equalization enabled, the performance of the continuous time linear equalizer circuit 400 is similar to that of the continuous time linear equalizer circuit 300. With pre-tap equalization disabled (post-tap equalization enabled), the performance of the continuous time linear equalizer circuit 400 is similar to the continuous time linear equalizer circuit 200 in post-top equalization mode. In the continuous time linear equalizer circuit 300, voltage headroom is consumed by the transistors 302, 304, 306, and 308.

This causes linearity degradation in the output of the continuous time linear equalizer circuit 300. Accordingly, the continuous time linear equalizer circuit 400 may provide improved linearity relative to the continuous time linear equalizer 300.

Figure 5:
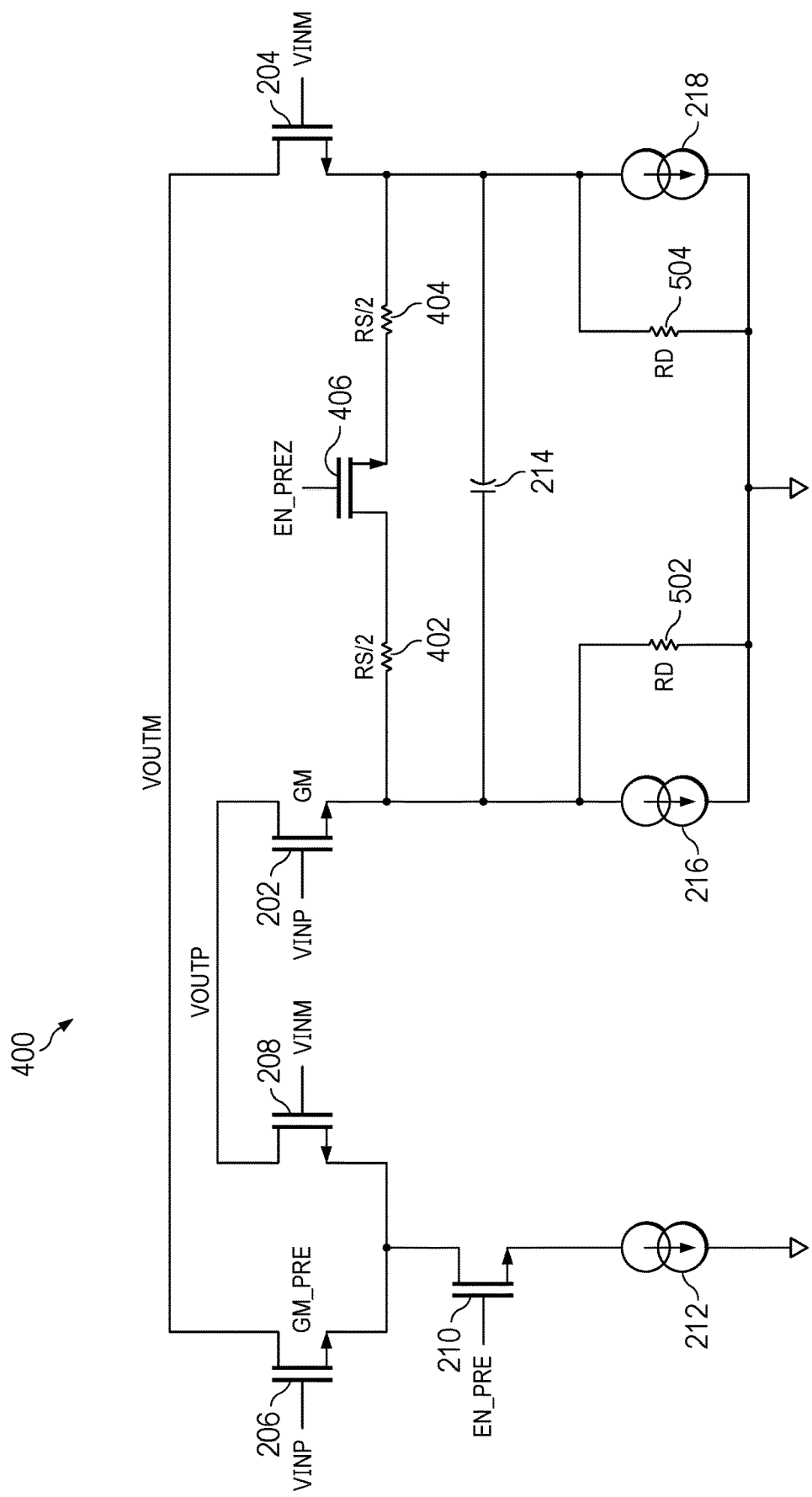
FIG. 5 is a schematic diagram of the continuous time linear equalizer circuit of FIG. 4 showing parasitic resistances associated with the tail current sources.

FIG. 5 is a schematic diagram of the continuous time linear equalizer circuit 400 showing parasitic resistors 502 and 504 in parallel with the current source 216 and the current source 218. With pre-tap equalization enabled, the resistors 502 and 504 (resistances Rd) across the current sources 216 and 218 draw a current in opposite phase to $$\text{gm\_pre} \cdot gmd = \frac{gm}{1 + gmRd}$$

that may degrade equalizer performance.

At low frequencies, the net current is Gm_dc=(gm_pre−gmd). This DC gain is compromised due to the current flowing in the opposite phase. To maintain reasonable DC gain, Gm_pre_new=gm_pre+gmd. This restores Gm_dc=gm_pre.

At high frequencies, the capacitor 214 bypasses the resistors 502 and 504.

$$Gm\_\text{high\_freq} = gm - gm\_\text{pre\_new} \tag{22}$$

$$Gm\_\text{high\_freq} = gm - gm\_\text{pre} - gmd \tag{23}$$

$$\text{Boost} = \frac{Gm\_\text{high\_freq}}{Gm\_DC} = \frac{gm \cdot gm\_\text{pre} - gmd)}{gm\_\text{pre}} = K - 1 - \frac{gmd}{gm\_\text{pre}} \tag{24}$$

$$\text{where } gmd = \frac{gm}{1 + gmRd}, \text{ gm\_pre} = \frac{gm}{1 + gm * Rs/2},$$

$$\text{Boost} - K - 1 - \frac{1 + gm * \frac{rs}{2}}{1 + gmRd} = K - 1 - RS/2RD \tag{25}$$

Figure 6:
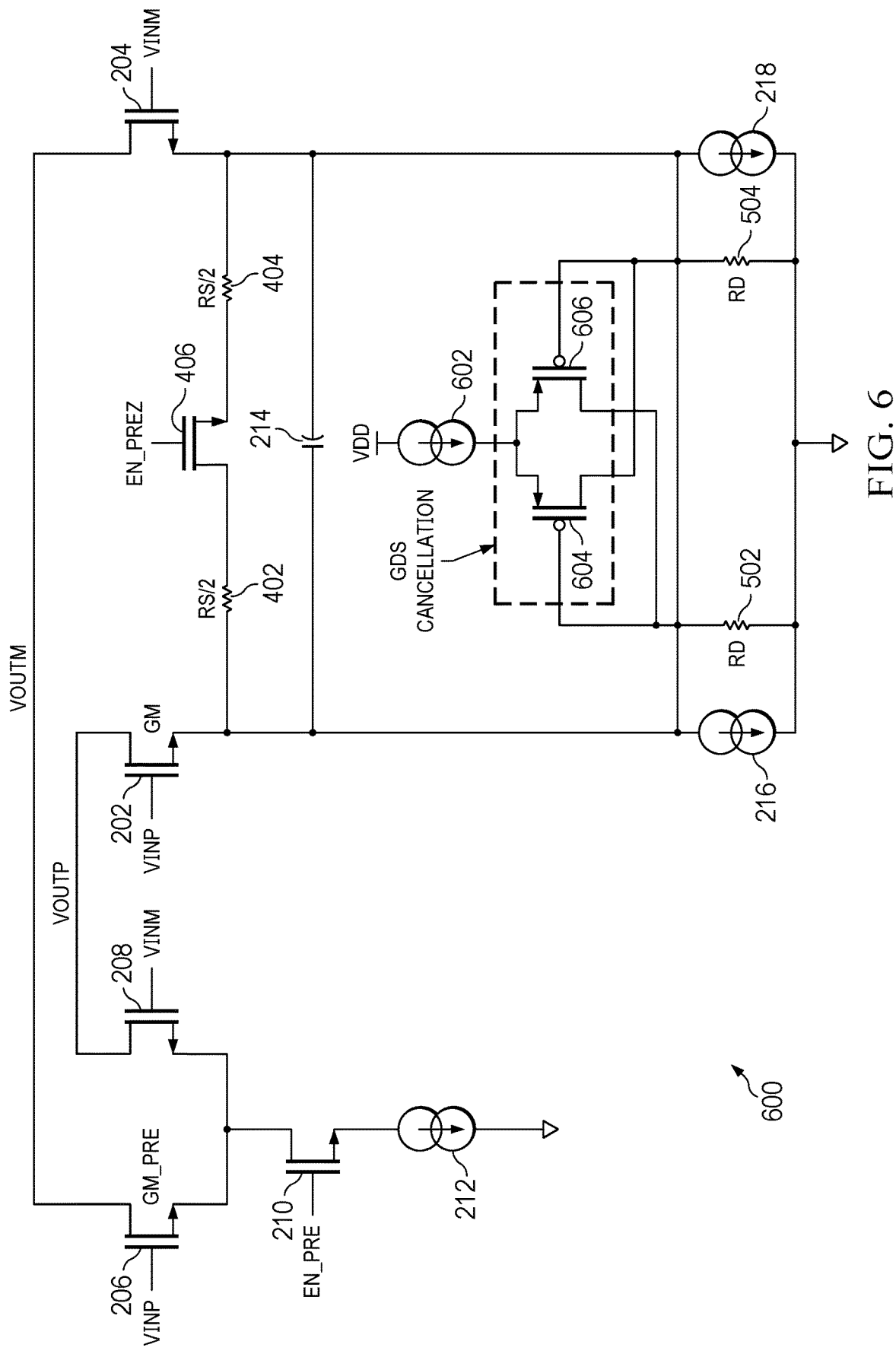
FIG. 6 is a schematic diagram of a fourth example continuous time linear equalizer circuit with pre-tap equalization and optional post-tap equalization suitable for use in the equalizer of FIG. 1B.

FIG. 6 is a schematic diagram of a fourth example continuous time linear equalizer circuit 600 with pre-tap equalization suitable for use in the equalizer 150. The continuous time linear equalizer circuit 600 is similar to the continuous time linear equalizer circuit 400. The continuous time linear equalizer circuit 600 includes transistors 202, 204, 206, 208, 210, and 406, capacitor 214, resistors 402 and 404, and current sources 212, 216, and 218 similar to the continuous time linear equalizer circuit 400. The continuous time linear equalizer circuit 600 also includes a current source 602, and transistors 604 and 606. The transistors 604 and 606 may be p-type FETs. An input terminal of the current source 602 is coupled to a power supply terminal (VDD). A first current terminal (e.g., source) of the transistor 604 is coupled to an output terminal of the current source 602, and a second current terminal (e.g., drain) of the transistor 604 is coupled to second current terminal of the transistor 204. A control terminal (e.g., gate) of the transistor 604 is coupled to the second current terminal of the transistor 202. A first current terminal (e.g., source) of the transistor 606 is coupled to the output terminal of the current source 602, and a second current terminal (e.g., drain) of the transistor 606 is coupled to second current terminal of the transistor 202. A control terminal (e.g., gate) of the transistor 606 is coupled to the second current terminal of the transistor 204.

The transistors 604 and 606 operate as gds cancellation transistors. The transistors 604 and 606 increase the effective resistance of the resistor 502 and the resistor 504 as:

$$R\text{deff}=Rd/(1-Rd*Gm\text{can}) \tag{26}$$

where Gmcan is the gm of the transistors 604 and 606.

The transistors 604 and 606 reduce the DC output of phase current with respect to gm_pre to produce a pre-tap boost that is very close to K−1 in the continuous time linear equalizer circuit 600.

While the continuous linear equalizer circuits 200, 300, 400, and 600 have been described herein as including n-type FETs, some implementations of the continuous linear equalizer circuits 200, 300, 400, or 600 may be implemented using p-type FETs and/or complementary metal oxide semiconductor (CMOS) input structures.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" or "enabled" means that the conduction channel of the FET is present and drain current may flow through the FET. References herein to a FET being "OFF" or "disabled" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:
    a first transistor having a first terminal, a second terminal, and a control terminal;
    a second transistor having a first terminal, second terminal, and a control terminal;
    a capacitor having a first conductor coupled to the second terminal of the first transistor, and a second conductor coupled to the second terminal of the second transistor;
    a third transistor having:
        a first terminal coupled to the first terminal of the second transistor;
        a second terminal; and
        a control terminal coupled to the control terminal of the first transistor; and
    a fourth transistor having:
        a first terminal coupled to the first terminal of the first transistor;
        a second terminal coupled to the second terminal of the third transistor; and
        a control terminal coupled to the control terminal of the second transistor.

2. The circuit of claim 1, further comprising:
    a fifth transistor having:
        a first terminal coupled to the second terminal of the fourth transistor;
        a second terminal; and
        a control terminal coupled to a pre-tap equalization enable terminal; and
    a current source having:
        a first terminal coupled to the second terminal of the fifth transistor; and
        a second terminal coupled to a reference voltage terminal.

3. The circuit of claim 1, further comprising:
    a resistor having:
        a first terminal coupled to the second terminal of the first transistor; and
        a second terminal coupled to the second terminal of the second transistor;
    a first current source having:
        a first terminal coupled to the second terminal of the first transistor; and
        a second terminal coupled to a reference voltage terminal; and
    a second current source having:
        a first terminal coupled to the second terminal of the second transistor; and
        a second terminal coupled to a reference voltage terminal.

4. The circuit of claim 1, further comprising:
    a fifth transistor having a first terminal, a second terminal, and a control terminal the control terminal coupled to a pre-tap equalization disable terminal;
    a first resistor having:
        a first terminal coupled to the second terminal of the first transistor; and
        a second terminal coupled to the first terminal of the fifth transistor;
    a second resistor having:
        a first terminal; and coupled to the second terminal of the fifth transistor; and
        a second terminal coupled to the second terminal of the second transistor;
    a first current source having:
        a first terminal coupled to the second terminal of the first transistor; and
        a second terminal coupled to a reference voltage terminal; and
    a second current source having:
        a first terminal coupled to the second terminal of the second transistor; and
        a second terminal coupled to the reference voltage terminal.

5. The circuit of claim 3, further comprising:
a fifth transistor having:
   a first terminal;
   a second terminal coupled to first terminal of the second current source; and
   a control terminal coupled to the second terminal of the first transistor;
a sixth transistor having:
   a first terminal coupled to the first terminal of the fifth transistor;
   a second terminal coupled to the first terminal of the first current source; and
   a control terminal coupled to the second terminal of the second transistor; and
a third current source having:
   a first terminal coupled to a power supply terminal; and
   a second terminal coupled to the first terminal of the fifth transistor.

6. The circuit of claim 1, further comprising:
a fifth transistor having:
   a first terminal coupled to the first terminal of the second transistor;
   a second terminal coupled to the first terminal of the third transistor; and
   a control terminal;
a sixth transistor having:
   a first terminal coupled to the first terminal of the first transistor;
   a second terminal coupled to the first terminal of the fourth transistor; and
   a control terminal coupled to the control terminal of the fifth transistor;
a seventh transistor having:
   a first terminal coupled to the first terminal of the sixth transistor;
   a second terminal coupled to the second terminal of the fifth transistor; and
   a control terminal;
an eighth transistor having:
   a first terminal coupled to the first terminal of the fifth transistor;
   a second terminal coupled to the second terminal of the sixth transistor; and
   a control terminal coupled to the control terminal of the seventh transistor.

7. A circuit comprising:
a first transistor having a first terminal, a second terminal, and a control terminal;
a second transistor coupled to the first transistor as a first differential pair, the second transistor having a first terminal, a second terminal, and a control terminal;
a third transistor having:
   a first terminal coupled to the first terminal of the second transistor;
   a second terminal; and
   a control terminal coupled to the control terminal of the first transistor;
a fourth transistor coupled to the third transistor as a second differential pair, the fourth transistor having:
   a first terminal coupled to the first terminal of the first transistor;
   a second terminal; and
   a control terminal coupled to the control terminal of the second transistor; and
a fifth transistor coupled to the second differential pair, the fifth transistor configured to switchably enable pre-tap equalization.

8. The circuit of claim 7, further comprising:
a current source having:
   a first terminal; and
   a second terminal coupled to a reference voltage terminal;
wherein:
   the fifth transistor has:
      a first terminal coupled to the second terminal of the third transistor and the second terminal of the fourth transistor;
      a second terminal coupled to the first terminal of the current source; and
      a control terminal coupled to a pre-tap equalization enable terminal.

9. The circuit of claim 7, further comprising:
a sixth transistor having:
   a first terminal coupled to the first terminal of the first transistor;
   a second terminal coupled to the first terminal of the fourth transistor; and
   a control terminal;
a seventh transistor having:
   a first terminal coupled to the first terminal of the sixth transistor;
   a second terminal coupled to the first terminal of the third transistor; and
   a control terminal;
an eighth transistor having:
   a first terminal coupled to the first terminal of the second transistor;
   a second terminal coupled to the second terminal of the sixth transistor; and
   a control terminal coupled to the control terminal of the seventh transistor;
wherein the fifth transistor has:
   a first terminal coupled to the first terminal of the second transistor;
   a second terminal coupled to the first terminal of the third transistor; and
   a control terminal coupled to the control terminal of the sixth transistor.

10. The circuit of claim 7, further comprising a capacitor having:
   a first conductor coupled to the second terminal of the first transistor; and
   a second conductor coupled to the second terminal of the second transistor.

11. The circuit of claim 10, further comprising:
a first current source having:
   a first terminal coupled to the first conductor;
   a second terminal coupled to a reference voltage terminal; and
a second current source having:
   a first terminal coupled to the second conductor; and
   a second terminal coupled to the reference voltage terminal.

12. The circuit of claim 7, further comprising a resistor having:
   a first terminal coupled to the second terminal of the first transistor; and
   a second terminal coupled to the second terminal of the second transistor.

13. The circuit of claim 7, further comprising:
a first resistor having:
   a first terminal coupled to the second terminal of the first transistor; and
   a second terminal;

a second resistor having:
  a first terminal coupled to the second terminal of the second transistor; and
  a second terminal;
a sixth transistor having:
  a first terminal coupled to the second terminal of the first resistor;
  a second terminal coupled to the second terminal of the second resistor; and
  a control terminal coupled to a pre-tap equalization disable terminal.

14. The circuit of claim 13, further comprising:
a current source having:
  a first terminal coupled to a power supply terminal; and
  a second terminal;
a seventh transistor having:
  a first terminal coupled to the second terminal of the current source;
  a second terminal coupled to the second terminal of the second transistor; and
  a control terminal coupled to the second terminal of the first transistor; and
a eighth transistor having:
  a first terminal coupled to the second terminal of the current source;
  a second terminal coupled to the second terminal of the first transistor; and
  a control terminal coupled to the second terminal of the second transistor.

15. A deserializer comprising:
a clock data recovery circuit;
a linear equalizer circuit coupled to the clock data recovery circuit, the linear equalizer circuit including:
  a first transistor having a first terminal, a second terminal, and a control terminal;
  a second transistor having a first terminal, second terminal, and a control terminal;
  a capacitor having:
    a first conductor coupled to the second terminal of the first transistor; and
    a second conductor coupled to the second terminal of the second transistor;
  a first current source having:
    a first terminal coupled to the first conductor; and
    a second terminal coupled to a reference voltage terminal;
  a second current source having:
    a first terminal coupled to the second conductor; and
    a second terminal coupled to the reference voltage terminal;
  a third transistor having:
    a first terminal coupled to the first terminal of the second transistor;
    a second terminal; and
    a control terminal coupled to the control terminal of the first transistor; and
  a fourth transistor having:
    a first terminal coupled to the first terminal of the first transistor;
    a second terminal coupled to the second terminal of the third transistor; and
    a control terminal coupled to the control terminal of the second transistor; and
  a fifth transistor coupled to the third transistor, the fifth transistor configured to switchably enable pre-tap equalization.

16. The deserializer of claim 15, wherein:
the linear equalizer circuit includes:
  a current source having:
    a first terminal; and
    a second terminal coupled to a reference voltage terminal; and
the fifth transistor has:
  a first terminal coupled to the second terminal of the fourth transistor;
  a second terminal coupled to the first terminal of the current source; and
  a control terminal coupled to a pre-tap equalization enable terminal.

17. The deserializer of claim 15, wherein:
the fifth transistor has:
  a first terminal coupled to the first terminal of the second transistor;
  a second terminal coupled to the first terminal of the third transistor; and
  a control terminal; and
the linear equalizer circuit includes:
  a sixth transistor having:
    a first terminal coupled to the first terminal of the first transistor;
    a second terminal coupled to the first terminal of the fourth transistor; and
    a control terminal coupled to the control terminal of the fifth transistor;
  a seventh transistor having:
    a first terminal coupled to the first terminal of the sixth transistor;
    a second terminal coupled to the second terminal of the fifth transistor; and
    a control terminal;
  an eighth transistor having:
    a first terminal coupled to the first terminal of the fifth transistor;
    a second terminal coupled to the second terminal of the sixth transistor; and
    a control terminal coupled to the control terminal of the seventh transistor.

18. The deserializer of claim 15, wherein the linear equalizer circuit includes a resistor having:
  a first terminal coupled to the first conductor of the capacitor; and
  a second terminal coupled to the second conductor of the capacitor.

19. The deserializer of claim 15, wherein the linear equalizer circuit includes:
a first resistor having:
  a first terminal coupled to the second terminal of the first transistor; and
  a second terminal;
a second resistor having:
  a first terminal coupled to the second terminal of the second transistor; and
  a second terminal;
a sixth transistor having:
  a first terminal coupled to the second terminal of the first resistor;
  a second terminal coupled to the second terminal of the second resistor; and
  a control terminal coupled to a pre-tap equalization disable terminal.

20. The deserializer of claim 15, wherein the linear equalizer circuit includes:

a third current source having:
  a first terminal coupled to a power supply terminal; and
  a second terminal;
a sixth transistor having:
  a first terminal coupled to the second terminal of the third current source;
  a second terminal coupled to the first terminal of the second current source; and
  a control terminal coupled to the first terminal of the first current source; and
a seventh transistor having:
  a first terminal coupled to the second terminal of the third current source;
  a second terminal coupled to the first terminal of the first current source; and
  a control terminal coupled to the first terminal of the second current source.

\* \* \* \* \*